United States Patent [19]
Brookshier

[11] 4,214,632
[45] Jul. 29, 1980

[54] SOIL TILLING MACHINE HAVING APPARATUS FOR AUTOMATIC NEGATIVE BRAKING AND DRIVE CONTROL

[76] Inventor: Ernest L. Brookshier, R.R. #2, Centerview, Mo. 64019

[21] Appl. No.: 876,116

[22] Filed: Feb. 8, 1978

[51] Int. Cl.³ .................... A01B 33/00; B62D 51/04
[52] U.S. Cl. ...................................... 172/42; 172/116
[58] Field of Search ................. 172/42, 43, 125, 21, 172/22, 114, 116, 123; 180/19 R, 19 S, 19 H

[56] References Cited

U.S. PATENT DOCUMENTS

| | | | |
|---|---|---|---|
| 1,398,777 | 11/1921 | Gunther | 180/19 R |
| 1,878,442 | 9/1932 | Hamshaw | 172/43 |
| 2,314,035 | 3/1943 | Dontje | 172/42 |
| 2,645,987 | 7/1953 | Brooks | 172/42 |
| 2,776,533 | 1/1957 | Yacoby | 172/42 X |
| 2,824,506 | 2/1958 | Smithburn | 172/42 X |
| 2,908,337 | 10/1959 | Surprise et al. | 172/125 X |
| 4,062,408 | 12/1977 | Enters et al. | 172/42 X |
| 4,074,764 | 2/1978 | Enters | 172/42 |

FOREIGN PATENT DOCUMENTS

| | | | |
|---|---|---|---|
| 805821 | 5/1951 | Fed. Rep. of Germany | 172/42 |
| Ad.23666 | 7/1921 | France | 172/42 |
| 958223 | 5/1964 | United Kingdom | 172/42 |

*Primary Examiner*—Richard T. Stouffer
*Attorney, Agent, or Firm*—Schmidt, Johnson, Hovey & Williams

[57] ABSTRACT

A self powered, handlebar operated, earth cultivating machine having a worm gear engine drive and a transversely extending, soil engaging rotating tine wheel is provided with a pair of ground engaging traction wheels spaced therebehind and a sprocket and chair drive train coupled between the tine wheel and each of the traction wheels for driving the latter to selectively propel or brake the machine in accordance with the traction created by the tine wheel with the tilled soil. The worm gear and chain drive train cooperate to lock the traction wheels into a constant driving relationship with the tine wheel in a manner to automatically compensate both for excessive forward thrust produced by the latter in hard soil and for insufficient thrust created thereby in soft soil whereby to eliminate lurching and stalling of the machine and achieve especially smooth, consistent tilling operation.

3 Claims, 2 Drawing Figures

SOIL TILLING MACHINE HAVING APPARATUS FOR AUTOMATIC NEGATIVE BRAKING AND DRIVE CONTROL

TECHNICAL FIELD

This invention generally deals with power driven, soil conditioning machines and deals more particularly with improved drive control apparatus for soil tilling machines, especially of the small, hand-manipulated "garden" tiller type.

BACKGROUND ART

Small, engine driven earth cultivators or tilling machines having ground engaging, rotating tines and handlebars manipulated by an operator following the machine on foot, have been in use a number of years. Normally, a plurality of tine members are mounted on a rotatable shaft to form a transversely extending tine wheel assembly mounted beneath the machine's engine. The rotating tines are urged to penetrate the ground under the weight of the machine and create a forward traction force to propel the machine forward as the earth is being tilled. The rate at which the machine is propelled forward is dependent on several factors including the number and configuration of the tines, the rate at which the tine wheel rotates, the weight of the machine, and the nature and composition of the soil being tilled. Usually, in the interest in manufacturing economy, the tine wheel is driven at a single speed so that the only variable factor affecting the forward speed of tilling machine is the nature and composition of the soil. In the case of hard, densely packed soil, the tilling machine moves more rapidly over the ground due to the fact that the tines experience additional traction as a result of increased resistance presented by the packed soil to the movement of the tines therethrough. Also, because of the additional resistance presented by the soil, the tines do not fully penetrate the soil in their course of rotation, but rather push the machine upwardly away from the ground. Obviously, under these conditions, the tilling machine tends to move rapidly over upper surface layers of the ground and does not thoroughly till the soil in the desired manner.

As evidenced by U.S. Pat. No. 2,824,506, others in the past have attempted to ameliorate this problem by rigidly mounting a plow-like braking tool on the tilling machine which functions to plow into the soil and produces a negative braking force to counteract the excess forward thrust developed by the tine wheel, resulting in the forward speed of the machine being slowed so that successive revolutions of the tines dig down into the soil to achieve penetration to the desired soil depth and thorough tilling action. Generally, during the tillage of a typical plot of ground, the density and hardness of the soil will vary in adjacent locations, consequently, the braking tool may operate satisfactorily in the more densely packed soil locations, but exerts an excessive amount of braking force when the tilling machine enters areas of less dense soil, in which case the thrust produced by the tine wheel is not sufficient to propel the machine forward and the tine wheel proceeds to dig successively deeper into the soil until the tilling machine becomes stalled in one location. Most known tilling machines are provided with a frame arrangement including elongate handlebars which allows pivotal movement of the machine by its operator in a manner to permit altering the tine wheel's elevation, so that by selective manipulation of the handlebars in combination with the use of the braking tool, the effects on the machine produced by varying soil conditions are at least partially neutralized. In practice, however, the use of these plow-like braking tools results in the tilling machine lurching forward from time to time as it becomes impossible to eliminate momentary lurching and stalling of the machine; in fact, the operation of the tilling machine resulting from the use of the braking tool is sufficiently unsatisfactory that it is not uncommon for many operators to remove and discard the braking tool. Without the use of a braking tool, the vehicle operator must compensate for the excessive thrust produced by the tine wheel by pulling rearwardly on handlebars to counter-act the thrust, while at the same time selectively pivoting the machine in order to maintain a constant penetration depth.

Another problem complicating the design of tilling machines, related somewhat to the foregoing problems, is the difficulty in cultivating loosely packed or low density soil. When tilling low density soils using conventional tilling machines, the soil offers little resistance to the tines, consequently the traction created by the tine wheel sometimes is inadequate to propel the machine forward in which case the tines dig successively deeper into the soil and the machine becomes stalled in one location unless the operator tilts the machine in a manner to raise the tine wheel before the latter digs too deeply into the ground. Since it is impractical for the operator to actually push the tilling machine forward when inadequate thrust is provided by the tine wheel in loose soil, others in the past have designed tilling machines having a ground engaging drive wheel, in addition to the tine wheel, which is driven by the engine and functions to assure that the machine is provided with forward propulsion at all times, regardless of the nature and composition of the soil being tilled. In addition to the previously mentioned prior art patent, further prior art disclosing tilling machines having a power driven drive wheel includes U.S. Pat. Nos. 2,645,987 and 2,776,533. Although these prior art tilling machines compensate somewhat for the lack of tine wheel thrust under loose soil conditions, these machines have been found not to operate satisfactorily when the ground is relatively hard, even in conjunction with the use of a plow-like braking tool discussed above. Typically, for reasons which will become later apparent, the prior art tilling machines employed belt and pulley assemblies commonly connecting the tine wheel and a single ground engaging drive wheel with the engine, and as result of slippage, along with other factors, the tine wheel and ground engaging drive wheel were not locked into constant, positive driving relationship to each other, consequently, when traversing harder ground, the excessive thrust created by the tine wheel could not be counter-acted by the ground engaging drive wheel, but rather the plow-like braking tool was required to compensate for the excessive forward thrust. Also, under some circumstances, due to the excessive resistance created by solidly packed soil, slippage in the drive belt assembly between the engine and tine wheel often resulted so that proper tilling action could not be achieved. Furthermore, when this type of prior art tilling machine was employed to till loosely packed, low density soil, wherein the tine wheel created negligible forward driving thrust, the ground engaging drive wheel often experienced slippage in the drive belt assembly which prevented the delivery of a constant, metered driving force needed to propel the machine forward at a constant rate of speed. In any event, it can be appreciated from the foregoing discussion that as a result of the rapidly changing magnitudes of thrust experienced by the tine wheel when the latter traversed soils of various hardness the drive belt assembly experienced frequent slippage due to the impulse-like transmission of forces transmitted therethrough, consequently, the ground engaging drive wheel was ineffective to supply both the forward and reverse traction forces in the proper magnitudes and at the proper times to permit smooth, satisfactory operation of the machine, so that the operator was still required to selectively manipulate the machine's handlebars in order to compensate for the lurching and stalling effects experienced by these machines.

A further undesireable feature of the prior art tilling machines of the type having a single ground engaging, power driven wheel resides in the fact that the tine wheel was required to be mounted at a position laterally offset from the longitudinal axis of the machine, on the opposite side of the wheel being driven in order to compensate for the torquing effect produced by the driving of only one, rather than both ground engaging wheels. This construction feature of prior art machines was unattractive from a manufacturing standpoint and necessarily limited the width of the tine wheel which could be used. Apparently, prior art machines included provision for driving only one of the ground engaging wheels, since in order to permit sharp turning of the machine, one of the ground engaging wheels was required to be free wheeling and acted as a pivot point about which the opposite driving wheel propelled the machine during the execution of a turn of the latter. Although these prior art machines satisfactorily executed sharp turns, tractability was poor as a result of the interplay of torquing forces produced by the tine wheel and ground engaging drive wheel. Because of the deficiencies inherent in the prior art machine design of the type having a single, power driven ground engaging wheel, tilling machines employing such designs have never gained widespread use and the vast majority of present design tilling machines do not include a power driven drive wheel.

DISCLOSURE OF THE INVENTION

The present invention provides apparatus for driving a pair of ground engaging traction wheels on a tilling machine in a manner to provide synchronized, automatic forward drive and negative braking control which completely eliminates machine lurching and stalling and the need for the operator to control the machine's attitude by "man handling" the handlebars, yet which also permits easy turning of the machine. According to the present invention, an engine powered, earth tilling machine is provided with a transversely extending, shaft mounted, rotating tine wheel and a pair of ground engaging power driven, traction wheels closely spaced therebehind and carried by a frame having handlebar type controls. An output shaft of the engine is connected through a worm and wheel gear combination to the tine wheel shaft. The opposite extremities of the tine wheel shaft each have secured thereto a sprocket wheel which is coupled via force transmitting roller chains and speed reducing means to respective sprockets secured on each of the traction wheels. Thus, a positive, non-slip drive train is established between the engine, tine wheel, and both traction wheels which maintains a constant driving relationship between the tine wheel and traction wheels such that the traction wheels impose negative braking force on the machine when excess thrust produced by the tine wheel attempts to propel the machine forward at a rate of speed greater than the speed provided by the rotational rate of the traction wheels, but impose a positive, forward driving force on the machine at all other times when the tine wheel thrust is less than that magnitude of thrust provided by the traction wheels.

BEST MODE FOR CARRYING OUT THE INVENTION

Figure 1:
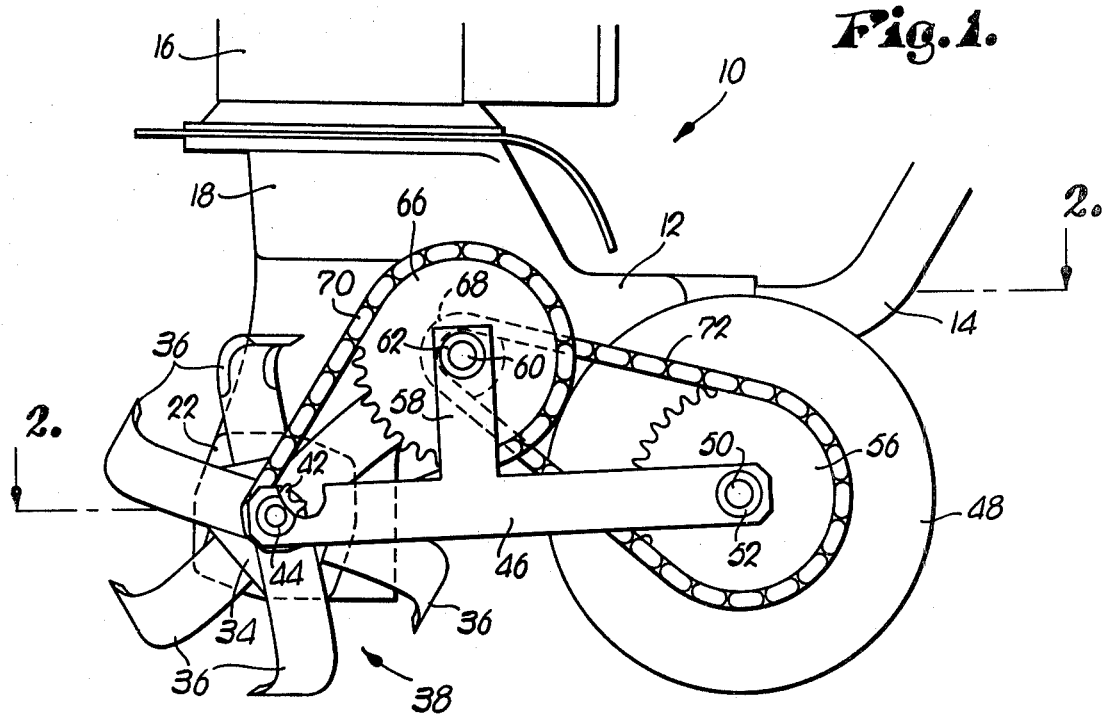
FIG. 1 is a fragmentary, side elevational view of a soil tilling machine having apparatus for automatic negative braking and drive control, which forms the preferred embodiment of the present invention.

Referring now to the drawing, a soil tilling or cultivating machine generally indicated by the numeral 10 includes a frame section 12 provided with a longitudinally extending, upwardly projecting rod member 14 terminating in a pair of handlebars (not shown) adapted to be gripped and manipulated by an operator of the machine 10. An internal combustion engine 16 is mounted on upper portions of the frame section 12 and has an output drive shaft (not shown) thereof extending downwardly into the frame section 12 and more particularly into a selectively operable, operator controlled clutching mechanism of conventional type (not shown) enclosed within the clutch housing 18. A drive shaft 20 associated with the mentioned clutch mechanism extends downwardly within the clutch housing 18 into the gear case 22 and has secured to the lower end thereof a worm gear 24 that meshingly engages the wheel gear 26 which is securely mounted by suitable means on the transversely extending, essentially horizontal tiller shaft 28. A plurality of transversely spaced tine assemblies 30 are secured to the sleeve members 32 which are in turn made fast to the tiller shaft 28, each of the assemblies 30 comprising a triangularly shaped plate 34 having a plurality of circumferentially spaced tine elements 36 secured thereto and projecting outwardly from each of the apexes thereof. The tine assemblies 30, in combination with the tiller shaft 28 form a rotating tine wheel generally indicated by the numeral 38. A bearing member 40 is sleeved over each of the opposite ends of the tiller shaft 28 and includes an outwardly extending movable portion upon which a drive sprocket 42 is mounted for rotation along with tiller shaft 28, bearing members 40 further including a stationary portion adapted to be secured by suitable fastening means 44 to the forward end of a longitudinally extending support plate 46.

A pair of transversely spaced, ground engaging traction wheels 48 are mounted for rotation upon opposite extremities of the axle 50 by bearing means (not shown), the outer opposite ends of axle 50 being secured to the rearward, respective extremities of support plates 56 by suitable retaining means 52, intermediate stretches of the axle 50 being securely fastened to and supported by the vertically extending support struts 54 which are secured to rearward portions of the frame section 12.

Traction wheels 48 are essentially equally spaced from the transverse center of the machine 10 and the transverse center of the tine wheel 38. A toothed, wheel sprocket 56 is mounted on the outer side of each of the traction wheels 48 and is normally rotatable coaxially along with the latter about the stationary axle 50. However, for reasons which will become later apparent, it may be desireable to connect the wheel sprockets 56 to the traction wheels 48 by releasable means (not shown) which will permit selective rotation of the wheels 48 while the wheel sprockets 56 remains stationary. The support plates 46 each include an upwardly projecting leg 58, the upper extremity of each of the legs 58 being adapted to have stationarily mounted therebetween a transversely extending, intermediate fixed shaft 60 by means of retaining elements 62. A bearing assembly 64 is mounted on opposite extremities of shaft 60 and each carry a cluster sprocket assembly comprising a larger outer sprocket 66 respectively longitudinally aligned with the drive sprocket 42, and an inner sprocket 68 respectively longitudinally aligned with the wheel sprocket 56. A forward drive chain 70, preferable of the roller type, is trained around drive sprocket 42 and outer sprocket 66, while a rear drive chain 72, also preferably of the roller type, is trained around the inner sprocket 68 and wheel sprocket 56. From the foregoing, it can be appreciated that since the inner and outer sprockets 66 and 68 respectively are held stationary with respect to each other on the bearing assembly 64, a rigid, non-slip drive train is created from the engine 16 down through worm gear 24 and wheel gear 26 through the tiller shaft 28, thence from sprocket 42 and chain 70 to sprocket 66 and 68, and finally to the traction wheels 48 via chain 72 and drive sprocket 56. Moreover, it is important to note that by virtue of the tine shaft 32 being coupled via wheel gear 26 and worm gear 24 to the output shaft of the engine 16, the traction wheels 48 are driven in smooth, continuous synchronization with the tine wheel 38 regardless of the relative magnitudes of traction forces (produced by the soil) experienced by either the tine wheel 38 or traction wheels 48.

In operation, the power output of the engine 16 is precisely translated to the tiller shaft 28 through the worm gear 24 and wheel gear 26, causing the tine wheel 38 to rotate in a clockwise direction, as viewed in FIG. 1, at a constant rate of rotation. Referring now particularly to FIG. 1, as the tiller shaft 28 rotates, drive sprocket 42 also rotates in a clockwise direction to turn the outer sprocket 66 by means of the front drive chain 70; the outer and inner sprocket 66 and 68 respectively being fixed for simultaneous rotation, inner sprocket 68 likewise rotates in a clockwise direction to drive wheel sprocket 56 via rear drive chain 72. In the embodiment disclosed herein, outer and inner sprockets 66 and 68 respectively provide a means to accomplish speed reduction between the rotational speed of the tiller shaft 28 and the desired rotational speed of the traction wheels 48. Normally, sprockets 42, 66, 68 and 56 will be chosen to provide gearing such that the traction wheels 48 provide neither positive forward nor negative braking traction for the machine 10 when the tine wheel 36 is tilling through soil of a predetermined "average" hardness, whereby to propel the machine 10 forwardly at a given rate of speed. Under actual field conditions however, the consistency and hardness of the soil will vary, so that the traction wheels 48 will generally always be imparting a positive forward driving force, or negative braking force upon the machine 10 in a manner to control the operation of the tine wheel 38 to assure that the latter penetrates the soil to a desired level and achieves a thorough tilling action while at the same time eliminating lurching movement of the machine 10 and maintaining the latter's rate of forward travel essentially constant. For example, assume first that the machine 10 is traversing ground wherein the soil is of a loosely packed, low density nature such that the tine elements 36 penetrate the soil with ease and produce very little forward, positive traction to propel the machine 10 forwardly; under these conditions, the traction wheels 48 produce the additional magnitude of forward, positive traction necessary to propel the machine 10 forwardly at the desired rate of speed. More significantly, when the vehicle 10 traverses ground wherein the soil is of a harder, more densely packed nature, the tines 36 experience maximum traction but are reluctant to penetrate the soil to the desired level and attempt to propel the machine 10 forwardly at a rate of speed in excess of that speed produced by a rotational rate of traction wheels 48; under these circumstances, although the traction wheels 48 are turning in a clockwise direction as viewed in FIG. 1, the forward traction created by the tine wheel 38 exceeds that produced by the traction wheels 48, so that the latter resist the action by the tine wheel 38 by producing a reverse traction force equal in magnitude to the excess forward thrust created by the tine wheel 38 which negates such excess forward thrust and imposes a negative braking action on the machine 10. As a result of this novel negative braking control on opposite lateral sides of the machine 10 by the traction wheels 48, the tine shaft 28 is maintained perpendicular to the forward direction of travel of the machine 10, and the forward progress of the tine wheel 38 is slowed so that successive revolutions of the tine elements 36 produce eventual tillage of the soil to the desired penetration depth. Due to the non-slip, sprocket and chain gear train connecting the traction wheels 48 and tine wheel 38, the traction wheels 48 react instantaneously to momentary variations in the traction experienced by the tine elements 36, whereby the traction wheels 48 provide continuous, automatic positive forward, and negative braking control on the machine 10 in order to completely eliminate the tendancy of the tine wheel 38 to produce lurching or stalling of the machine 10. The worm gear 24 and wheel gear 26 play a significant role in the operation of the machine 10 since reactive forces produced by the cooperative operation of tine wheel 38 and traction wheels 48 are not communicated back through the engine drive train, consequently the interreactive forces between the tine wheel 38 and traction wheels 48 are confined to the sprocket and chain drive train previously discussed. Preferably, the traction wheels 48 are mounted at a position on the machine 10 to support a significant portion of the latter's weight in order that they may supply an adequate magnitude of reverse traction when the tine wheel 38 is experiencing maximum forward traction and producing excess forward thrust; this is particularly important since if the traction wheels 48 are not capable of generating the necessary magnitude of reverse traction, the wheels 48 will simply slide over the soil and the forward progress of the tine wheel 38 will exceed the desired rate so that proper tilling action to the desired depth is not achieved.

Figure 2:
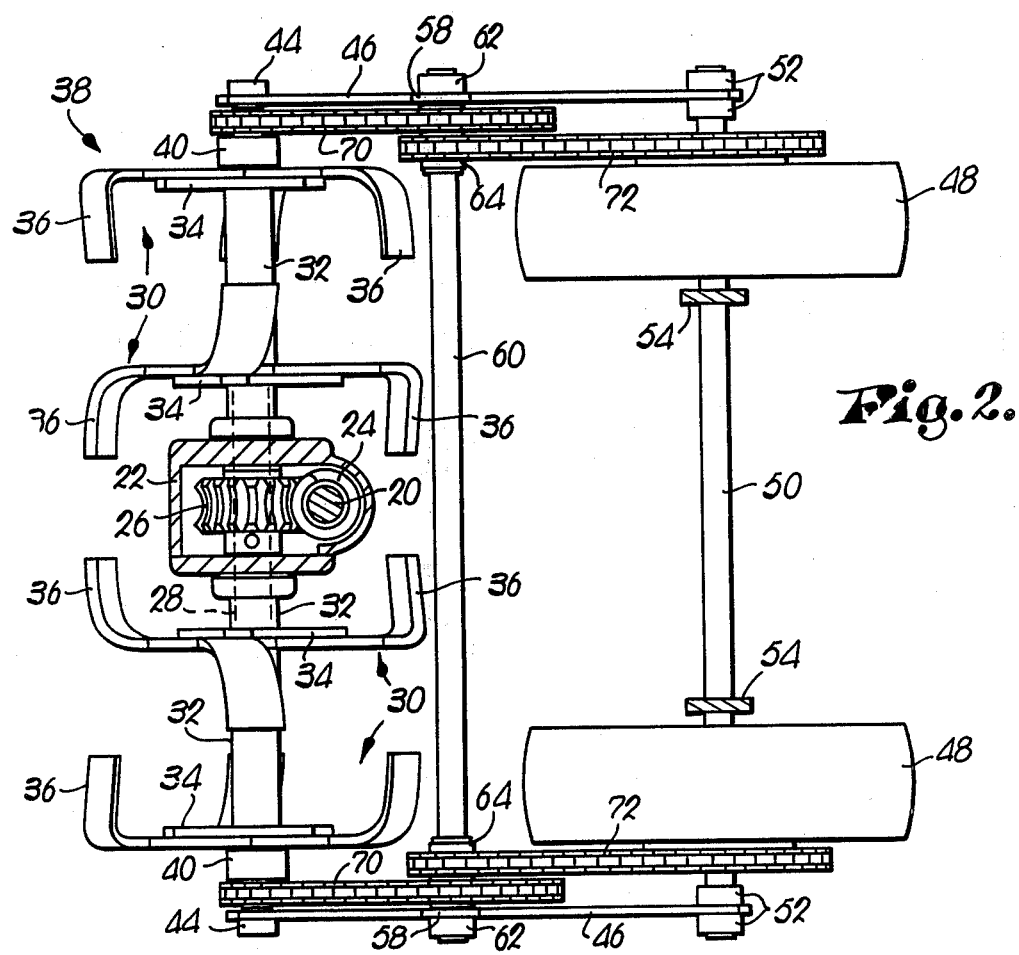
FIG. 2 is a sectional view taken along the line 2—2 in FIG. 1.

The operator of the machine 10 may adjust the depth of soil penetration of the tine wheel 38 merely by pivoting the machine 10 about the traction wheels 48 in a manner to change the elevation of the tine wheel 38; forward tilting of the machine 10 producing greater depth penetration of the tine wheel 38 while rearward tilting raises the tine wheel 38 in elevation and reduces the depth of soil penetration. Obviously, the normal depth of soil penetration produced by the tine wheel 38 in the absence of operator influence on the machine 10 will be determined in part by the diameter of the traction wheels 48, so that the size of the latter will be chosen in accordance with the particular application and other construction details of the machine 10. Assuming that the operator of the machine 10 wishes to simply maintain the constant, predetermined soil penetration depth produced by the tine wheel 38, the operator need only guide the machine 10 by steering the handlebars (not shown) of the latter. The operator need not constantly pivot the machine 10 in order to maintain a constant depth of soil penetration, nor is he required to push or pull the machine 10 to maintain a constant rate of forward travel. Sharp turns of the machine 10 can be effected simply through the exertion of leverage by the machine's operator on the machine's handlebars. For example, assuming it is desired to execute a turn toward the right, or clockwise direction as viewed in FIG. 2, the operator need only restrain the forward movement of the right traction wheel 48 by restraining the right side of the handlebar, whereupon the forward progress of the right traction wheel 48 will be halted and the latter will spin in place over the ground, while the left traction wheel 48 will continue to supply sufficient traction to propel the left side of the machine 10 forwardly whereby to pivot the latter around a pivot point defined by the contact between the right traction wheel and the ground until the turn has been executed at which time the right side of the handlebar may be released and both left and right traction wheels 48 will then provide, in combination with the tine wheel 38, forward positive driving traction for propelling the machine 10 forwardly.

INDUSTRIAL APPLICABILITY

The method and method of use of the invention have been made apparent by the foregoing description thereof. The invention is well adapted for use in tilling machines of the type having a worm gear drive of the type aforementioned, however it is to be noted that a suitable non-slip, engine drive train of any suitable type would be acceptable in carrying out the invention.

From the foregoing, it is clear that the invention provides an especially effective means for controlling the forward positive, and negative braking traction of a hand operated, tilling machine, and does so in a particularly simple and reliable manner. Thus, it will be observed that the improved apparatus not only provides for the reliable accomplisment of the object of the invention, but does so in a particularly simple and economical manner. It is recognized, of course, that those skilled in the art may make various modifications or additions to the preferred embodiment chosen to illustrate the invention without departing from the gist and essence of my contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patent is:

1. In a self-propelled, hand maneuvered, rotating cultivator type machine for tilling soil of either a predetermined intermediate hardness, a hardness significantly less than said predetermined hardness or a hardness significantly greater than said predetermined hardness, with substantial uniformity of forward speed of the machine, tilling depth, and number of rotations of the cultivator component per unit of forward travel of the machine for all of said hardnesses of the soil being tilled:

a mobile frame having a direction of forward travel;
   wheel shaft means mounted on said frame adjacent the rear of the latter;
   a pair of ground engaging traction wheels mounted on said wheel shaft means for rotation about a first horizontal axis transverse to said direction of travel of said frame;
   a tined, rotary, soil tilling cultivator assembly having a horizontally extending shaft part mounted on said frame adjacent the front of the latter for rotation about a second horizontal axis transverse to said direction of travel of said frame, in spaced parallelism with said first axis and disposed forwardly of the latter;
   a motor assembly mounted on said frame above said cultivator assembly and having a downwardly extending, substantially vertical power output shaft;
   first coupling means including a worm mounted on said output shaft and a cooperating gear mounted on said shaft part of said cultivator assembly, said worm being meshed with said gear for rotating said cultivator assembly at a predetermined rotational speed and constituting means for producing a force of magnitude for moving said machine forwardly at a predetermined and desired linear speed when said cultivator assembly is tilling soil of said predetermined intermediate hardness but of magnitude that would tend to move said machine forwardly at undesirably greater or lesser linear speeds when said cultivator assembly is tilling soils of hardness respectively greater or less than said predetermined intermediate hardness;
   second coupling means including first sprocket means mounted on said shaft part of said cultivator assembly, second sprocket means connected with said drive wheels, and connecting means including chain means positively coupling said first sprocket means with said second sprocket means for driving said traction wheels at a predetermined rotational speed coordinated with the rotational speed of said cultivator assembly and said desired linear speed of said machine and constituting means for automatically exerting an extra forward propelling force upon said machine of magnitude for maintaining the speed of forward movement of said machine substantially at said desired linear speed thereof when said cultivator assembly is tilling soil of hardness less than said predetermined intermediate hardness and for automatically exerting a rearward retarding force upon said machine of magnitude for maintaining the speed of forward movement of said machine substantially at said desired linear speed thereof when said cultivator assembly is tilling soil of hardness greater than said predetermined intermediate hardness without exertion by said traction wheels of either a forward propelling or a rearward retarding force upon said machine when the latter is being moved forwardly at said desired linear speed by the rotation of said cultivator assembly, said machine being propelled forwardly primarily by said cultivator assembly when the latter is tilling soil of at least said predetermined intermediate harness and by said traction wheels when said cultivator assembly is tilling soil of less than said predetermined intermediate hardness.

2. The invention of claim 1, wherein said connecting means comprises:

a rotatable idler shaft intermediate said first and second axes and in parallelism therewith;

third sprocket means on said idler shaft;

fourth sprocket means on said idler shaft;

chain means positively connecting said first sprocket means with said third sprocket means; and chain means positively connecting said fourth sprocket means with said second sprocket means, the rotational ratios of said first and third sprocket means and said second and fourth sprocket means being such as to maintain said rotational speed of said traction wheels coordinated as aforesaid with the rotational speed of said cultivator assembly and said desired linear speed of said machine.

3. The invention of claim 2, wherein:

said traction wheels are disposed respectively adjacent opposite sides of said frame, and said cultivator assembly is substantially co-extensive transversely of said machine with the transverse distance spanned by said traction wheels.

* * * * *